Dec. 11, 1956   C. D. SULLIVAN   2,773,530
COMBINATION MASHER AND FORK
Filed March 24, 1953

Inventor:
Cornelius D. Sullivan
BY Roy Griffith Jones
Attorney.

United States Patent Office 2,773,530
Patented Dec. 11, 1956

2,773,530

COMBINATION MASHER AND FORK

Cornelius D. Sullivan, West Long Branch, N. J.

Application March 24, 1953, Serial No. 344,325

1 Claim. (Cl. 146—204)

This invention relates to a combination masher and feeding fork intended especially for young children, but useful for adults under some circumstances and conditions.

It is known that young children between certain ages require that their foods be mashed, this due to the fact that they have not yet acquired molar teeth. This necessitates extra work by mothers in mashing the food before putting on the children's plates or other dishes, it being appreciated that it would be impractical for a child to perform this operation, especially considering that there may be several different kinds of foods served at any one meal which require mashing and that there may be a few such children in one family.

This invention eliminates the above mentioned operation, thus saving the mother's time in the preparation of meals, and additionally functions to train the young children themselves.

According to the invention, each child is enabled to mash his own food with a masher of convenient size and form and to use the same instrument with which to eat the food, as the article is a combination masher and fork. However, as the usual fork is rather sharp and pointed at the free ends of the tines, which may injure the young child, either during normal use or otherwise, I provide a guard across the ends of the tines, which is a valuable feature of my invention.

Another valuable feature is that the article may be economically manufactured, in that it is essentially the usual feeding or eating fork modified in a simple but effective way to accomplish the stated purposes.

Figure 1:
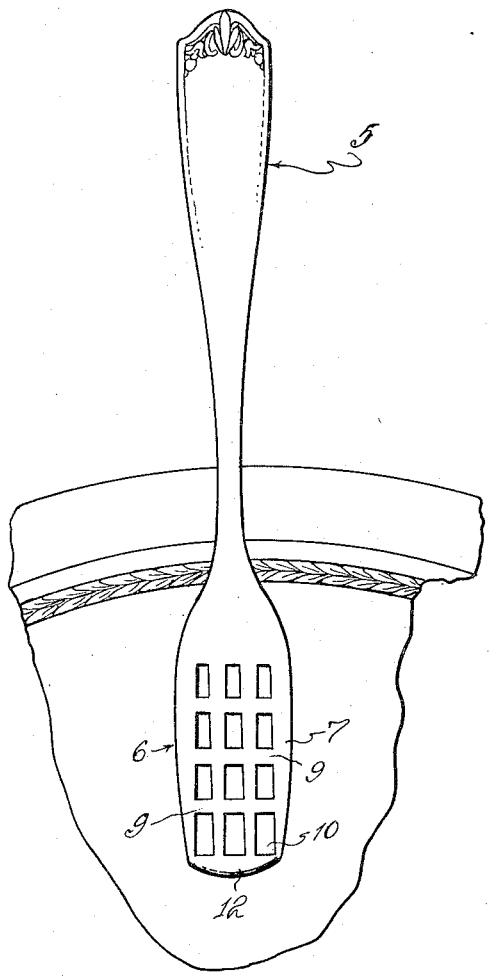
Figure 2:
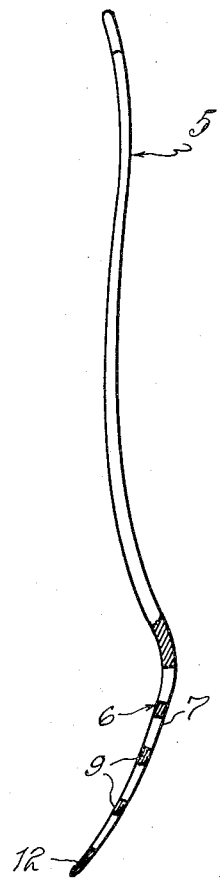

A preferred form of the invention is shown in the accompanying drawings, in which Fig. 1 is a plan view of the article, and Fig. 2 is a side view of the same, partly in section.

Referring to the drawings for a more detailed description thereof, the article comprises a handle 5 and a functional portion 6 integral therewith. The functional part may be described as including tines 7 similar to those of a conventional eating fork, from which viewpoint adjacent tines are connected by cross pieces 9, whereby to form a plurality of rows of openings 10 through which food may pass in mashing. As distinguished from the usual sharp-ended tines of the conventional fork, the present article is provided with a guard 12 at the ends of the tines, to make it safe for a child to use and handle. The whole article is preferably made in one piece and it is to be noted that neither the sides nor the end thereof have sharp edges. And it is to be understood that the drawing indicates only one form of the invention and that various modifications may be made within the scope of the inventive concept.

What is claimed is:

A child's eating implement, for mashing, picking up and carrying food, comprising an elongate handle, a shank integral with the handle and extending lengthwise thereof, a furcated functional part integral with the shank and extending lengthwise thereof and consisting of spaced, tapered, elongate branches extending lengthwise of the handle and shank, spaced cross pieces connecting the branches intermediate the ends of the latter, and a guard across the outer ends of the branches, the functional part being concave lengthwise only, on its front or upper face, and convex lengthwise only, on its back, the mentioned branches having smooth front, back and side surfaces.

References Cited in the file of this patent

UNITED STATES PATENTS

| 885,444 | Cram | Apr. 21, 1908 |
| 1,350,098 | Hessey | Aug. 17, 1920 |
| 2,423,487 | Daboul | July 8, 1947 |
| 2,455,623 | Stone | Dec. 7, 1948 |

FOREIGN PATENTS

| 182,477 | Canada | Feb. 26, 1918 |